(12) United States Patent
Mulhouse et al.

(10) Patent No.: US 7,766,246 B2
(45) Date of Patent: Aug. 3, 2010

(54) VARIABLE SPEED BLOWER CONTROL IN AN HVAC SYSTEM HAVING A PLURALITY OF ZONES

(75) Inventors: David P. Mulhouse, Minnetonka, MN (US); David J. Arneson, Ham Lake, MN (US); Brad Paine, Minnetonka, MN (US)

(73) Assignee: Honeywell International Inc., Morristown, NJ (US)

( * ) Notice: Subject to any disclaimer, the term of this patent is extended or adjusted under 35 U.S.C. 154(b) by 641 days.

(21) Appl. No.: 11/686,651

(22) Filed: Mar. 15, 2007

(65) Prior Publication Data
US 2008/0223943 A1 Sep. 18, 2008

(51) Int. Cl.
*F24F 7/00* (2006.01)
(52) U.S. Cl. .......................... 236/49.3; 236/1 B; 62/186
(58) Field of Classification Search ................. 236/1 B, 236/44 A, 44 C, 49.3; 62/186; 165/217
See application file for complete search history.

(56) References Cited

U.S. PATENT DOCUMENTS

| | | | |
|---|---|---|---|
| 3,664,414 A | 5/1972 | Raleigh | |
| 3,892,104 A | 7/1975 | Klee et al. | |
| 4,071,745 A | 1/1978 | Hall | |
| 4,205,381 A | 5/1980 | Games et al. | |
| 4,335,320 A | 6/1982 | Garver | |
| 4,338,791 A | 7/1982 | Stamp, Jr. et al. | |
| 4,495,986 A | 1/1985 | Clark et al. | |
| 4,501,125 A | 2/1985 | Han | |
| 4,530,395 A | 7/1985 | Parker et al. | |
| 4,795,088 A | 1/1989 | Kobayashi et al. | |
| 4,830,095 A | 5/1989 | Friend | |

(Continued)

FOREIGN PATENT DOCUMENTS

SK     SL 20556     10/2001

OTHER PUBLICATIONS

Lennox Installation Instructions-Harmony III Zone Control System (Jan. 2006).*

(Continued)

*Primary Examiner*—Cheryl J Tyler
*Assistant Examiner*—Jonathan Bradford
(74) *Attorney, Agent, or Firm*—Crompton Seager & Tufte LLC

(57) ABSTRACT

A zone control panel for use with an HVAC system having zone control and a variable speed blower, and a method for controlling a fluid temperature conditioning device. In one aspect, the zone control panel includes a plurality of thermostat terminals for receiving thermostat signals, a plurality of damper terminals for transmitting damper control signals, and one or more terminals for transmitting signals to control a fluid temperature conditioning device having a variable speed blower. The zone control panel also includes a blower terminal for transmitting a signal to a dehumidification terminal associated with the fluid temperature conditioning device, where the dehumidification terminal is labeled or indicated for use with a dehumidification operating mode or for initiating a dehumidification operating mode of the variable speed blower. The blower terminal changes state in response to the number of zones that are calling for conditioning and changes between only a first off state and a second alternating current (AC) signal state. The change in the state of the blower terminal causes the speed of the variable speed blower to change.

18 Claims, 3 Drawing Sheets

U.S. PATENT DOCUMENTS

| | | |
|---|---|---|
| 4,843,084 A | 6/1989 | Parker et al. |
| 4,932,466 A | 6/1990 | Foster |
| 5,024,265 A | 6/1991 | Buchholz et al. |
| D319,429 S | 8/1991 | D'Aleo et al. |
| 5,042,265 A | 8/1991 | Baldwin et al. |
| 5,092,394 A | 3/1992 | Foster |
| 5,129,234 A | 7/1992 | Alford |
| D329,226 S | 9/1992 | Holbrook |
| 5,161,608 A | 11/1992 | Osheroff |
| 5,245,835 A | 9/1993 | Cohen et al. |
| 5,303,767 A | 4/1994 | Riley et al. |
| 5,318,104 A | 6/1994 | Shah et al. |
| 5,344,069 A | 9/1994 | Narikiyo |
| 5,348,078 A | 9/1994 | Dushane et al. |
| 5,449,319 A | 9/1995 | Dushane et al. |
| 5,495,887 A | 3/1996 | Kathnelson et al. |
| 5,751,572 A | 5/1998 | Maciulewicz |
| 5,818,194 A | 10/1998 | Nordby |
| 5,829,674 A | 11/1998 | Vanostrand et al. |
| 5,860,473 A | 1/1999 | Seiden |
| 5,944,098 A | 8/1999 | Jackson |
| 5,983,890 A | 11/1999 | Thomas et al. |
| 6,196,467 B1 | 3/2001 | Dushane et al. |
| D449,279 S | 10/2001 | Takach, Jr. et al. |
| D454,544 S | 3/2002 | Takach, Jr. et al. |
| 6,402,043 B1 | 6/2002 | Cockerill |
| 6,540,148 B1 | 4/2003 | Salsbury et al. |
| 6,574,581 B1 | 6/2003 | Bohrer et al. |
| 6,705,533 B2 | 3/2004 | Casey et al. |
| 6,711,471 B2 | 3/2004 | Kidder |
| 6,725,914 B2 | 4/2004 | Petterson |
| 6,851,621 B1 | 2/2005 | Wacker et al. |
| 6,856,841 B2 | 2/2005 | Peterson |
| 6,874,693 B2 | 4/2005 | Readio |
| 6,879,881 B1 | 4/2005 | Attridge, Jr. et al. |
| 6,964,174 B2 | 11/2005 | Shah |
| 6,967,565 B2 | 11/2005 | Lingemann |
| 6,986,708 B2 | 1/2006 | Demster |
| 6,997,390 B2 | 2/2006 | Alles |
| 7,000,849 B2 | 2/2006 | Ashworth et al. |
| 7,017,827 B2 | 3/2006 | Shah et al. |
| 7,047,092 B2 | 5/2006 | Wimsatt |
| 7,055,759 B2 | 6/2006 | Wacker et al. |
| 7,106,019 B2 | 9/2006 | Becerra et al. |
| 7,114,554 B2 | 10/2006 | Bergman et al. |
| 7,130,719 B2 | 10/2006 | Ehlers et al. |
| 7,150,408 B2 | 12/2006 | DeLuca |
| 7,156,316 B2 | 1/2007 | Kates |
| 7,188,002 B2 | 3/2007 | Chapman, Jr. et al. |
| 7,191,607 B2 * | 3/2007 | Curtis .................. 62/186 |
| 7,228,693 B2 | 6/2007 | Helt |
| 7,320,362 B2 | 1/2008 | Nichols |
| 7,360,370 B2 | 4/2008 | Shah et al. |
| D590,352 S | 4/2009 | Jacoby et al. |
| 2003/0103075 A1 | 6/2003 | Rosselot |
| 2004/0194484 A1 | 10/2004 | Zou et al. |
| 2004/0262410 A1 | 12/2004 | Hull |
| 2005/0040248 A1 | 2/2005 | Wacker et al. |
| 2005/0043907 A1 | 2/2005 | Eckel et al. |
| 2005/0150238 A1 | 7/2005 | Helt |
| 2005/0156049 A1 | 7/2005 | Van Ostrand et al. |
| 2005/0159847 A1 | 7/2005 | Shah et al. |
| 2005/0159924 A1 | 7/2005 | Shah et al. |
| 2005/0228607 A1 | 10/2005 | Simons |
| 2005/0288824 A1 | 12/2005 | Fisher |
| 2006/0004492 A1 | 1/2006 | Terlson et al. |
| 2007/0045429 A1 | 3/2007 | Chapman, Jr. et al. |
| 2007/0050732 A1 | 3/2007 | Chapman, Jr. et al. |
| 2007/0057075 A1 | 3/2007 | Votaw et al. |
| 2007/0225868 A1 | 9/2007 | Terlson et al. |
| 2008/0161977 A1 * | 7/2008 | Takach et al. ............... 700/277 |

OTHER PUBLICATIONS

Carrier-4 Way Multipoise Variable-Capacity Condensing Gas Furnace (Aug. 2005).*
Bryant Model 340MAV, 350MAV, 355MAV Condensing Gas Furnace.*
"High Efficiency HVAC Motor", Appliance Magazine.com (Jul. 2006).
"Bryant Installation and Start-up Instructions Thermidistat Control" (1999).
"Carrier-4 Way Multipoise Variable-Capacity Condensing Gas Furnace" (Aug. 2005).
"ECM", www.geindustrial.com (Unknown).
"GE ECM 2.3 Series", www.geindustrial.com (Unknown).
"The X13 Blower Demo", GE ECM by Regal-Beloit (2006).
"Update on 4-Zone Arzel + Tappan Installation," hvac-talk.com (May 2005).
"Zoning with Variable Speed," hvac-talk.com (Mar. 16, 2006).
"Installation Instructions for Variable Speed Motor & Control" (Jul. 2006).
"Lennox Frequently Asked Questions", www.lennoxcommercial.com (2007).
"Lennox Installation Instructions-Harmony III Zone Control System" (Jan. 2006).
"Lennox-Installation Instructions-G61MPV Series Units", (Sep. 2006) 1,38.
"Bryant Model 340MAV, 350MAV, 355MAV Condensing Gas Furnace" (Unknown).
"Troubleshooting GE ECM Driven Systems", www.geindustrial.com (Unknown).
"Westinghouse Heating & Cooling Product Information", (Unknown),1-2.
"Why Buy a Two Stage And Variable Speed Furnace-Clarkson Comfort Zone", www.weinstall.ca/two_stage_heating.htm (Unknown).
"DIGI3U", Zonex Systems 3-Zone Universal Controller for G/E or Heat Pump Applications www.xonexsystems.com,(at least as early as Nov. 2, 2006), 2 pages.
"SmartZone System Manual", P/N 220022-02, CI Controls www.xcicontrols.com,(Oct. 3, 2005), pp. 1-20.
"Newest Product-UZC4", www.ewccontrols.com, (Oct. 20, 2005).
"Mini-Masterzone Zoning System—3 Zones", *Form* 2233-060321, Zonefirst MMZ3 Installation and Operating Instructions www.zonefirst.com,(2003), 4 pages.
"Owner's Manual", Aprilaire—Model 6504 www.aprilaire.com,(at least as early as Nov. 2, 2006.), pp. 1-12.
"Installation, Start-Up and Configuration Instructions", *Catalog* No. 533-30011, Carrier 3V™ Control System/VVT Zone Controller/Pressure Dependent Control Part No. 33ZCVVTZC-01,(2004), pp. 1-14.
"DuroZone ED3 Zoning Panel", www.durodyne.com,(2004), 2 pages.
"Technical Bulletin", EWC Controls, Inc. TB-206—Model NCM 300 Zone Control System www.ewccontrols.com,(2000), pp. 1-12.
"EMM-3 Electronic MiniZone Panel", 68-3041-2 G.H. Rev. 10-02, Honeywell www.honeywell.com/yourhome,(Oct. 2002), pp. 1-12.
"EMM-3U Universal Electronic MiniZone Panel", 68-0237-2 G.H. Rev. 11-02, Honeywell www.honeywell.com/yourhome,(Nov. 2002), pp. 1-16.
"TZ-4 TotalZone Zone Control Panel", 68-0259-1 G.H. Rev. 12-02, Honeywell www.honeywell.com/yourhome,(Dec. 2002), pp. 1-20.
"Comfort System Z-600 Zone Control", Jackson Systems, LLC www.jacksonsystems.com, (at least as early as Dec. 29, 2006.), 4 pages.
"Homeowner's Manual—Harmony III Zone Control System", Controls 505,024M/01/05,(Jan. 2005), pp. 1-6.
"SlimZone Premier Zone Control Panel", Robertshaw Climate Controls Americas www.icca.invensys.com,(2004), 35 pages.
"Siemens 3-144", CE1N3144en 13.02.2006, KNX Synco 700 Universal Controllers RMUZ Building Technologies, HVAC Products Universal controllers RMU710, RMU720, RMU730, (Feb. 13, 2006), pp. 1-15.

"Electronic Controls—Zone Control Family", *Taco Catalog* #100-5.0, Taco Hydronic Components & Systems www.taco-hvac.com, (Sep. 1, 2003), 4 pages.

"Tracker—Tracker Version 12—Building Automation System", BAS-PRC010-EN File No. PL-ES-BAS-000-PRC010-0503, Trane www.trane.com,(May 2003), pp. 1-32.

"WR—CZ-4 Master Control Panel", www.white-rodgers.com,(at least as early as Dec. 29, 2006.), pp. 246-253.

"ABB Brochure, To Measure is to Know, DIN Rail Mounted Electricity Meters", (Jan. 2006).

"ZONEFIRST-Masterzone Heat Pump Zoning System-Model MMH3", (unknown).

"Jackson Systems-Residential and Light Commericial Zone Control (Z-600) Two Position", www.jacksonsystems.com, (Unknown).

"EWC Controls Inc-Technical Bulletin Model UZC4 Zone Control", (Dec. 12, 2005), 1-24.

Drew, Jerry C., "XCI-Proper Staging Techniques for Multi-Stage Thermostats", *Home Toys Article*-www.hometoys.com, (Dec. 2002), 1-4.

"HVAC Talk", www.HVAC-talk.com, (Nov. 17, 2006).
http://www.hvac-talk.com/vbb/showthread.php?t=121627&hightlight=zone+timer, "Multi Stage Control—Zone Board or Tstat," 2 pages, Nov. 17, 2006.

ABB Installation Material, 2 pages, prior to Nov. 30, 2006.

Lennox, "Harmony III Zoning System, Dave Lennox Signature Collection," 4 pages, May 2005.

RobertShaw, "Slimzone Premier Zone Control Panel," 2 pages, 2004.

"QO Load Centers and Circuit Breakers," Order No. 1130BR0001R4/06, a Brand of Schneider Electric—Square D www.SquareD.com, 2004.

"Product Catalog," Arzel Zoning Technology, Inc. www.arzelzoning.com pp. 1-8, 2006.

"Enclosures and Cable Systems Overview," ABB, Nov. 2002.

\* cited by examiner

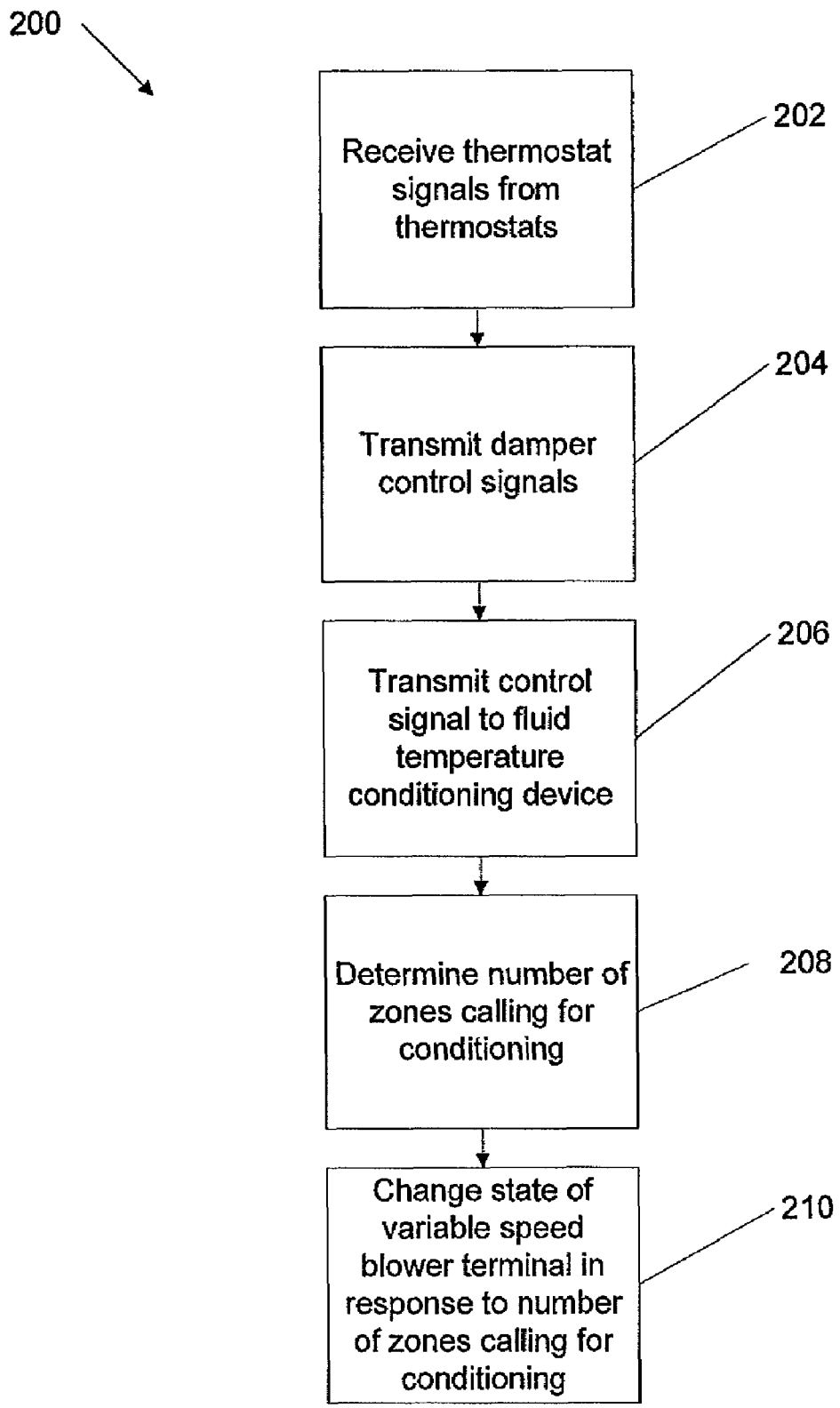

VARIABLE SPEED BLOWER CONTROL IN AN HVAC SYSTEM HAVING A PLURALITY OF ZONES

FIELD OF THE INVENTION

The invention relates to the control of HVAC equipment, and more particularly, to the control of HVAC equipment having a variable speed blower in a system having a plurality of zones.

BACKGROUND OF THE INVENTION

Many buildings, particularly relatively small buildings such as single-family houses, have a single heating, ventilation, and air conditioning (HVAC) unit that is controlled by a single thermostat. The HVAC unit typically comprises some type of fluid temperature conditioning device, such as a furnace for heating air or an air conditioner having an evaporating coil for cooling air. The conditioned air is typically ducted to various locations within the building. The thermostat in this type of space conditioning system is typically positioned at a location where the heating and cooling loads are representative of the entire structure. For example, the thermostat may be installed in an interior room away from windows and doors that would tend to influence the sensed temperature. The HVAC equipment then controls the heating and cooling of the entire structure according to the thermostat signal received from the single location.

However, a single thermostat location may not accurately represent the heating or cooling needs throughout the structure. Other locations of the building may have significantly greater or lower heating and cooling loads than exist at the location of the thermostat. For example, rooms having a larger surface area of windows, or rooms having a greater area of exterior walls, may require greater heat inputs to maintain the desired temperature. Similarly, rooms facing south or west, or rooms that are on an upper story, may require greater cooling inputs to maintain the desired temperature. In cases where the HVAC equipment is controlled only by a single thermostat, the heating or cooling supplied to each individual area of the building will be based on the heating or cooling needs at the thermostat location and not on the actual heating and cooling needs of each individual area. As a consequence, the heating and cooling loads of individual areas of the structure may not be satisfied and the temperature of these areas will tend to deviate from the desired temperature.

In some situations, it may be desired to control different locations within a building at different temperatures. For example, rooms that are seldom occupied may not need to be maintained at the same temperature as rooms that are frequently occupied. Energy that is used to heat or cool these unoccupied rooms is not used effectively or economically. Also, rooms may be occupied by people having special temperature needs, such as an elderly person or an infant, that are preferably maintained at a different temperature than the rest of the building. However, a system that has only a single thermostat is generally unable to accurately control different locations in the building at different temperatures.

One solution to this problem is to utilize HVAC zone control. Rather than having a single thermostat controlling the HVAC equipment, multiple thermostats are positioned at locations within the building that are expected to have different heating and cooling loads. Although it is possible that each of these thermostats could control a separate fluid temperature conditioning device such as a separate furnace or air conditioner for each zone, that approach is generally neither efficient nor economical. Rather, most commonly the ductwork that is used to transmit the conditioned air to the building spaces is configured with controls to adjust air flow to the various zones of the building corresponding to the various thermostats. For example, air ducts may be configured with controllable dampers that are capable of opening and closing to control the flow of air to a particular zone within the building when the thermostat in that zone calls for conditioning.

A system having HVAC zone control generally requires the use of a zone controller to receive the signals from the various thermostats, control the operation of the heating or cooling device, and control the distribution of the conditioned air through the ductwork. The zone controller typically comprises electronic circuitry for evaluating the heating or cooling needs of the various zones of the building and for determining an appropriate control of the heating or cooling device and the dampers or valves that control distribution. The distribution control is typically accomplished with a duct damper. A duct damper typically comprises a variable obstruction within the duct that can be actuated to one position where there is relatively little resistance to air flow within the duct, and can be actuated to another position where there is relatively great, or complete, resistance to air flow. Duct dampers can be controlled by any of a number of actuation means, including electronic, pneumatic, or mechanical. The HVAC zone controller generally is configured to open or close a duct damper in order to effectuate control over a zone in response to thermostat signals.

Traditional HVAC systems include a fixed speed or multiple speed, single phase, alternating current blower motor. For example, a conventional blower motor may be a permanent split capacitor (PSC) motor having a main winding and an auxiliary winding, where a capacitor is permanently positioned in series with the auxiliary winding and is used for both starting and running. Such a blower may be operated at a single set speed, or may be configured to operate at a plurality of set speeds based on selectively energizing current paths through the main winding having resistors of different values.

However, some HVAC systems are equipped with a fluid temperature conditioning device that has a variable speed blower. For example, a furnace or an air handling unit may be provided with a variable speed blower that is configured to provide infinitely variable blower output levels. Such variable speed blowers are available from Regal Beloit, of Beloit, Wis. under the trade names ECM 2.3, ECM 2.3, and ECM X13. A relatively higher blower output level may be associated with a relatively high fan speed, and a relatively lower blower output level may be associated with a relatively low fan speed. Such variable speed blowers are most commonly electrically commutated motors (ECM), that are brushless DC motors. A rectifier is provided to convert input AC current to DC current used to operate the motor. These motors are increasingly common in HVAC equipment because of their inherent energy efficiency, particularly at lower speeds, which results from the lack of the brushes associated with a commutator of a traditional DC motor and the ability to use three phase driving coils to create an inherently rotating magnetic field that drives a rotor.

In an HVAC system having both zone control and a fluid temperature conditioning device having a variable speed blower, it can be challenging to determine the proper control strategy for the variable speed blower. There is a need for improved controls for variable speed blowers used in HVAC systems having zone control.

SUMMARY OF THE INVENTION

One aspect of the invention relates to a zone control panel for use with an HVAC system having zone control and a variable speed blower. The zone control panel includes a plurality of thermostat terminals, where each thermostat terminal is configured to receive signals from one of a plurality of thermostats, and where each of the plurality of thermostats is located within one of a plurality of zones representing different spaces within a building. The zone control panel further includes a plurality of damper terminals, where each damper terminal is configured to transmit signals to control one of a plurality of zone dampers, and also includes one or more terminals for transmitting signals to control a fluid temperature conditioning device having a variable speed blower. In addition, the zone control panel includes a blower terminal for transmitting a signal to a dehumidification terminal associated with the fluid temperature conditioning device, where the dehumidification terminal is labeled or indicated for use with a dehumidification operating mode or for initiating a dehumidification operating mode of the variable speed blower. The blower terminal changes state in response to the number of zones that are calling for conditioning and changes between only a first off state and a second alternating current (AC) signal state. The change in the state of the blower terminal causes the speed of the variable speed blower to change.

A second aspect of the invention relates to a method of controlling a fluid temperature conditioning device. The method includes the steps of receiving a plurality of thermostat signals, wherein each of the plurality of thermostats is located within one of a plurality of zones, and transmitting a plurality of damper control signals, where each damper control signal controls one of a plurality of zone dampers. The method further includes the steps of transmitting an equipment control signal to control a fluid temperature conditioning device and determining a number of the plurality of the zones that are calling for conditioning. In addition, the method includes the step of changing the state of a variable speed blower terminal in response to the number of zones that are calling for conditioning. The variable speed blower terminal is configured to control a variable speed blower within the fluid temperature conditioning device, and the variable speed blower terminal is configured to change between only a first state and a second state where the first state is an off state and the second state is an alternating current signal state.

A third aspect of the invention relates to a zone control panel for use with a HVAC system having zone control and a variable speed blower. The zone control panel includes a plurality of thermostat terminals, where each thermostat terminal is configured to receive signals from one of a plurality of thermostats, where each of the plurality of thermostats is located within one of a plurality of zones in a building. The zone control panel further includes a plurality of damper terminals, where each damper terminal is configured to transmit signals to control one of a plurality of zone dampers. In addition, the zone control panel includes one or more terminals for transmitting signals to control a fluid temperature conditioning device. Furthermore, the zone control panel includes a variable speed blower terminal that changes state in response to the number of zones that are calling for conditioning, the variable speed blower terminal being configured to control a variable speed blower within the fluid temperature conditioning device. The variable speed blower terminal is configured to change between only a first state and a second state, where the first state is an off state and the second state is an alternating current signal state.

The invention may be more completely understood by considering the detailed description of various embodiments of the invention that follows in connection with the accompanying drawings.

BRIEF DESCRIPTION OF THE DRAWINGS

FIG. 3 is a schematic representation of a method of controlling a fluid temperature conditioning device.

Figure 1:
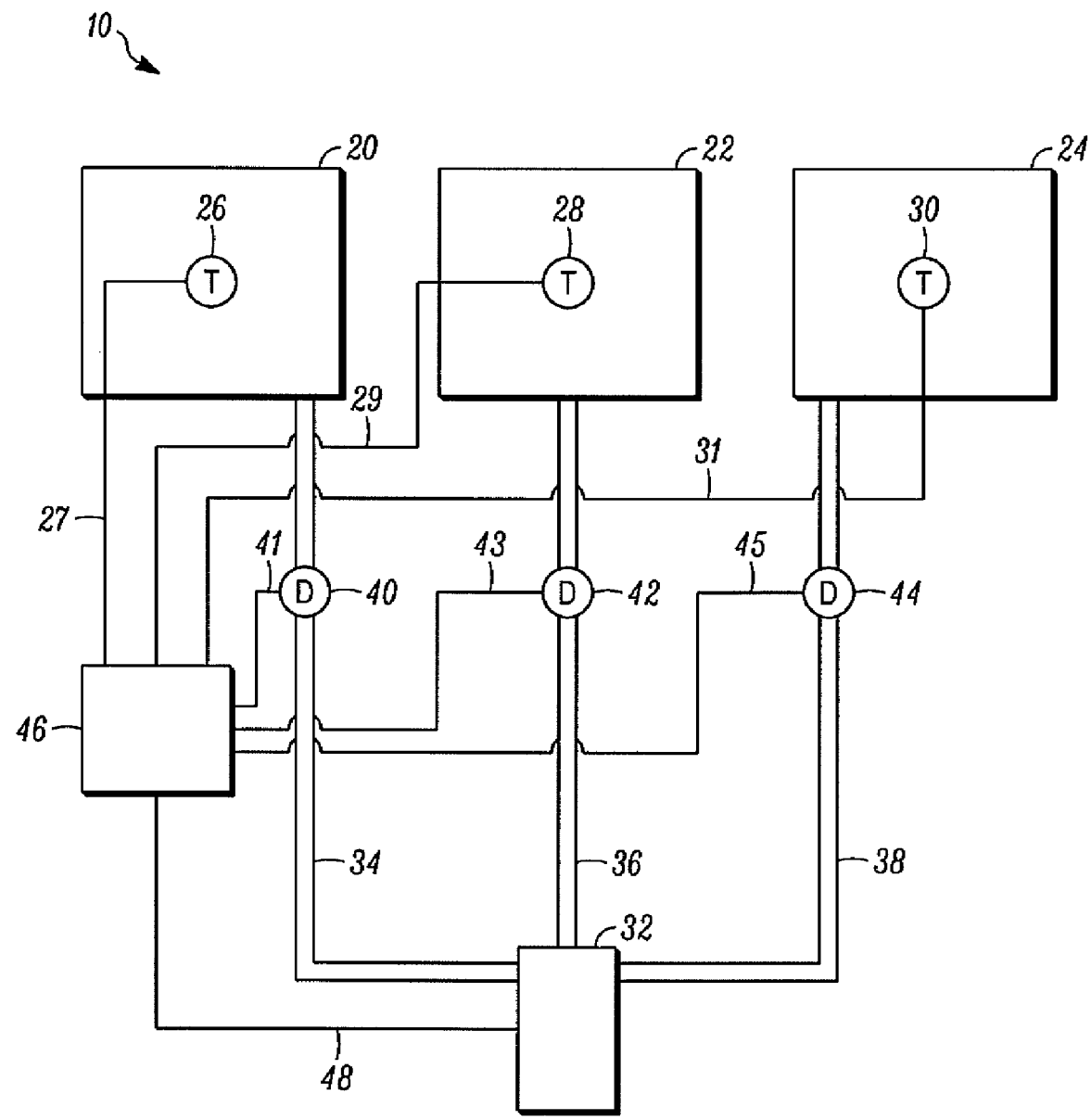
FIG. 1 is a schematic of an HVAC system having multiple zones (prior art).

While the invention may be modified in many ways, specifics have been shown by way of example in the drawings and will be described in detail. It should be understood, however, that the intention is not to limit the invention to the particular embodiments described. On the contrary, the intention is to cover all modifications, equivalents, and alternatives following within the scope and spirit of the invention as defined by the claims.

DETAILED DESCRIPTION OF THE INVENTION

As discussed above, it may be desirable for a building to have an HVAC system with zone control. FIG. 1 is a schematic of a typical HVAC system 10 having multiple zones. The embodiment of FIG. 1 is shown as having three zones. However, other embodiments having fewer or greater numbers of zones are usable. For example, some systems may have only two zones, while other systems may have four or more zones. Zones 20, 22, 24 are separate areas of a building. Each zone 20, 22, 24 includes a thermostat 26, 28, 30, respectively. A fluid temperature conditioning device 32, also called a conditioning device 32, is provided for increasing or decreasing the temperature of a fluid. For example, conditioning device 32 may be a furnace that increases the temperature of air. In the case where conditioning device 32 is a furnace, heated air is transmitted through ducts 34, 36, 38 to each of zones 20, 22, 24, respectively. Each duct 34, 36, 38 includes a damper 40, 42, 44, respectively, for controlling the flow of air through ducts 34, 36, 38. In other cases, conditioning device 32 may be a boiler, where hot water or steam is transmitted through pipes and controlled by valves. Zone controller 46 is configured to receive signals from each of thermostats 26, 28, 30, through cables 27, 29, 31, respectively. Zone controller 46 is also configured to transmit control signals to each of dampers 40, 42, 44, through cables 41, 43, 45. Zone controller 46 is further configured to transmit control signals to conditioning unit 32 through cable 48.

A variety of control strategies for zone controller 46 are usable. In general, however, zone controller 46 is configured to open and close dampers 40, 42, 44, in response to signals from thermostats 26, 28, 30, respectively, and to operate conditioning device 32. For example, if zone controller 46 senses that thermostat 26 is calling for heat because the temperature in zone 20 has fallen below a preset level, then zone controller 46 sends a signal to conditioning device 32 to turn on and signals damper 40 to be in an open position. Heated air from conditioning device 32 will then travel through duct 34, through damper 40, and into zone 20, thereby tending to increase the temperature within zone 20. If at the same time thermostats 28, 30 in zones 22, 24 do not call for heat, dampers 42, 44 will be in a closed position and heated air will not travel through ducts 36, 38 into zones 22, 24. The operation of HVAC system 10 in response to other thermostat signals from other zones and other combinations of zones is similar. HVAC system 10 may include other sensing devices and other sources of input to zone controller 46, as well as other actuating devices and other devices that are controlled by zone controller 46.

When a zone controller is in use, there may be, and in fact likely are, times where less than all of the zones are calling for conditioning. In this circumstance, at least some of the duct dampers will be closed and the overall airflow restriction in the system will be increased relative to a circumstance where all of the dampers are open. Where some of the dampers are closed, all of the airflow must then flow through a smaller portion of the duct system. However, if the blower continues to operate at a relatively high output, this will cause the air flow velocities in the portions of the duct system having open dampers to increase. In some cases, this increased flow velocity can be great enough to cause substantial noise. This noise can be objectionable to building occupants and high air velocities at supply registers may cause an air stream to impact an occupant and cause discomfort. Furthermore, the energy used to create such high air flow velocities is consumed unnecessarily.

Some systems having zone control are fitted with a bypass damper and associated ductwork to provide a flow path for excess air when at least some of the zone dampers are closed. A bypass damper is generally configured to provide a flow path for conditioned air from a supply duct to a return duct and in this way relieves excess flow and pressure from the supply ductwork. However, the use of a bypass damper and associated ductwork adds significant expense and labor to the installation of an HVAC system. Furthermore, energy is consumed inefficiently and unnecessarily when conditioned air is directed to the return air duct system without being used to supply conditioned air to the occupied spaces of the building. Moreover, directing conditioned air to the return air duct system can cause the return air temperature to deviate from acceptable ranges, possibly causing the discharge temperature of the conditioning device to exceed set limits.

Other HVAC systems having zone control use oversize supply ductwork so that the ductwork in any one zone is capable of flowing the entire volume of air when some of the zone dampers are closed. However, this solution adds cost to the system installation. Other systems may use zone dampers that do not fully close but rather have a controlled leakage rate, in order to provide a flow path for some of the excess air. However, this arrangement results in some conditioned air being delivered to zones that are not calling for conditioning, possibly resulting in a deviation of the temperature of those zones from their set point.

Some variable speed blowers are configured in such a way as to exacerbate the problem of high flow velocities when some of the dampers are closed. For example, some variable speed blowers are configured to monitor air flow parameters and to automatically modulate the blower speed as necessary to maintain a constant air flow. Where one or more dampers are closed, the increased resistance in the system will require the blower speed to be faster to deliver the same volumetric rate of air. While this control strategy may have some advantages, such as addressing the case where a dirty air filter causes flow to be reduced in the system, it creates disadvantages when such a blower is used with a zoned control system. This control strategy may cause the flow velocities to increase greatly, creating significant noise and occupant comfort issues.

For at least these reasons, a zone controller constructed according to the principles of the present invention is configured to operate a variable speed blower at a relatively lower output based on the number of zones that are calling for conditioning. Implementing this control strategy, however, can involve various difficulties. One reason for this is related to the fact that it is important for a zone controller to be compatible with HVAC equipment manufactured by many different manufacturers. It is common practice in the installation of HVAC systems in general, and zone control panels in particular, to use combinations of components or devices from various manufacturers. These different manufacturers may configure the equipment to respond differently to inputs or to require different inputs to receive the same response in blower operation. Providing a zone controller that is capable of controlling a variable speed blower in a wide variety of manufacturer's products is therefore a difficult task.

Many fluid temperature conditioning devices have a terminal that is configured to receive a signal to cause the HVAC system to operate in a dehumidification mode. This terminal is commonly labeled "DEHUM," "DS," or "BK," although other designations are also usable. This terminal is further indicated, either on the device itself or in other literature or sources that purport to describe the operation or use of the device, as being configured to receive a signal that indicates the presence of a dehumidification operating mode or causes the system to operate in a dehumidification operating mode. Moreover, the terminal is configured to operate the variable speed blower at a lower blower speed upon receipt of an appropriate signal. In one embodiment, the signal includes an increased voltage at the terminal, and in another embodiment, the signal includes a decreased voltage at the terminal. In one embodiment, the terminal is configured or indicated to be used with a dehumidistat. A dehumidistat is a device used to control the operation of a dehumidification operating mode, such as a mode where an air conditioner evaporating coil is used to condense humidity from the air. Such a terminal therefore can be called a dehumidification terminal.

A dehumidification terminal is generally configured to operate in a consistent and standardized fashion across different manufacturers' products. Specifically, the dehumidification terminal is configured to operate the fan at a lower output when a signal is present that indicates a call for dehumidification. This is advantageous during dehumidification because lower air velocity over the evaporating coils causes longer residence time of the air against the coil, thereby causing greater heat transfer from the air to the coil and a lower air temperature that results in a greater amount of moisture condensing on the coil.

An embodiment of the present invention transmits a signal to this dehumidification terminal to achieve a function that the dehumidification terminal was not intended to accomplish. Furthermore, this function is one that the dehumidification terminal is generally not described or indicated as being used for. Specifically, a zone controller of the present invention transmits a signal to the dehumidification terminal to cause the blower speed to be reduced when less than all zones are calling for conditioning. By utilizing this dehumidification terminal, a predictable and consistent response can be expected from the HVAC equipment and uncertainties regarding the interaction of HVAC equipment from different manufacturers can be minimized. In this way, the zone controller can reduce the blower speed when less than all zones are calling for conditioning, which in turn can result in lower air flow velocities, reduced noise, and greater occupant comfort.

In one embodiment, the zone controller is configured to transmit a signal to the dehumidification terminal to cause the blower to operate at a lower blower output when only one zone is calling for conditioning. In another embodiment, the zone controller is configured to signal the dehumidification terminal to operate at a lower blower output when only two zones are calling for conditioning. In yet another embodiment, the zone controller is configured to signal the dehumidification terminal to operate at a lower blower output when only three zones are calling for conditioning. Other embodiments are usable and may be configured as appropriate for HVAC systems having larger numbers of zones. In some embodiments, the zone controller is configured to signal the dehumidification terminal to operate at a lower blower output based on the percentage of zones calling for conditioning. For example, the blower may be signaled to operate at a lower output when less than 30% of zones are calling for conditioning, or in other embodiments, when less than 50% of zones are calling for conditioning.

Figure 2:
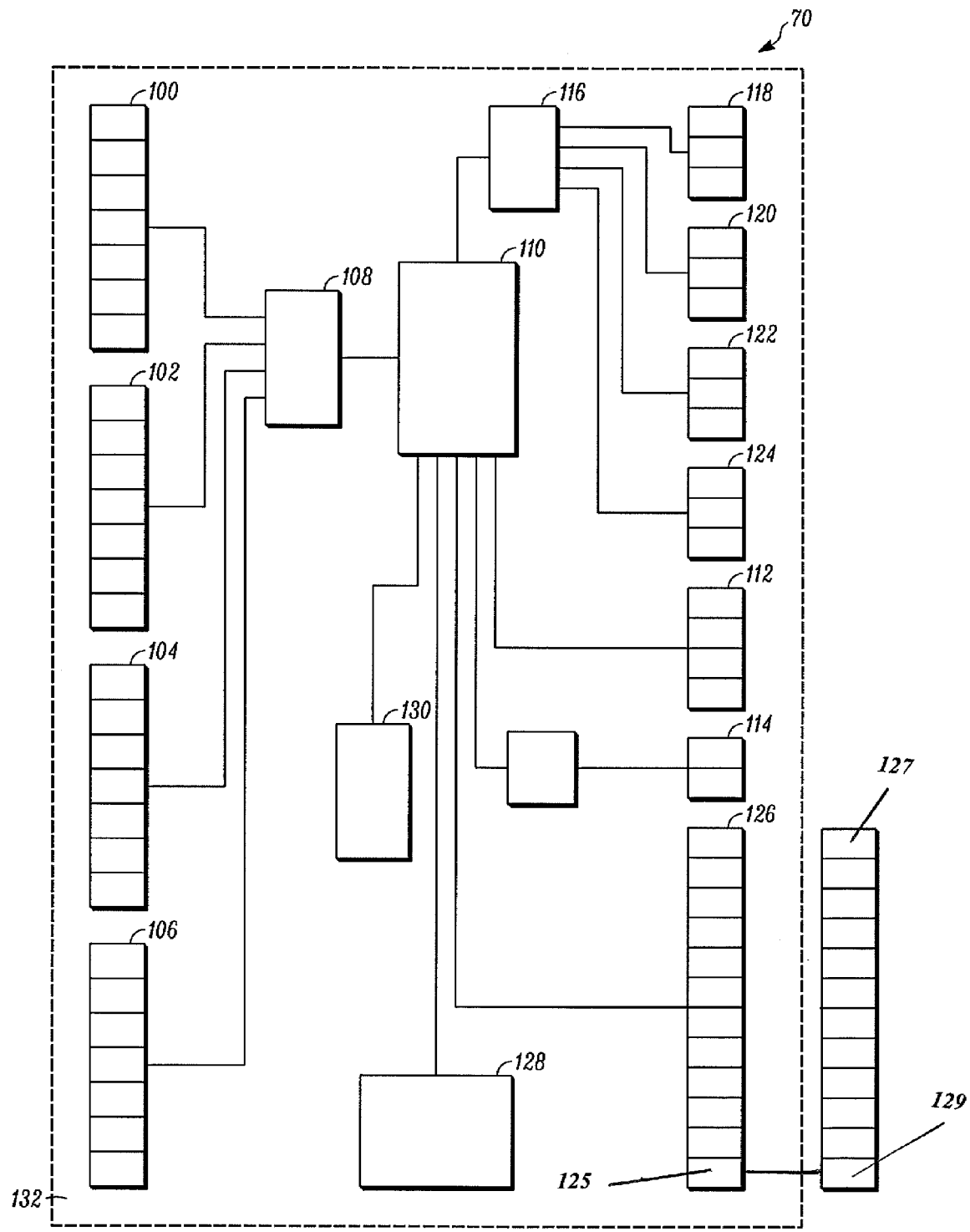
FIG. 2 is a schematic representation of the electronic components of an embodiment of a zone controller.

A zone controller constructed according to the principles of the present invention is depicted in FIG. 2. Zone controller 70 is configured to control a variable speed blower according to the number of zones that are calling for conditioning. However, many other embodiments and configurations of zone controller 70 are usable with the present invention. The zone controller 70 of FIG. 2 is configured for use with four zones. However, other configurations for other numbers of zones are usable. Zone controller 70 of FIG. 2 includes four thermostat terminals 100, 102, 104, 106. Each thermostat terminal 100, 102, 104, 106 is configured to receive wires from a thermostat. The number of wires depends on the thermostat and HVAC equipment that the zone controller is intended to be used with. The operation and characteristics of thermostats are known to those of skill in the art. In one embodiment, each thermostat has wires for connecting to a power supply transformer, calling for first stage heating, calling for second stage heating, calling for third stage heating, calling for first stage cooling, calling for second stage cooling, calling for fan power, calling for supplemental heating, and calling for actuating a changeover valve in a heat pump. Other thermostat embodiments are usable, having various subsets of these wires or additional wires. The thermostat terminals 100, 102, 104, 106 are configured to receive each of the thermostat wires that are present. The installer brings the wires from each thermostat to the zoning panel and connects each wire to the corresponding connection terminal.

Signals received at thermostat terminals 100, 102, 104, 106 are transmitted to an input processing component 108 and further to a microprocessor 110. Microprocessor 110 is configured to receive signals from sensor terminal 112. Sensor terminal 112 may be configured to receive signals from sensors such as an outdoor air temperature sensor and a discharge air temperature sensor. Other sensors are usable. The nature and construction of these sensors are known to those of skill in the art. A power input 114 is provided for connection to a power supply transformer. Microprocessor 110 is further configured to transmit signals to a driver 116, which in turn transmits signals to a plurality of damper terminals 118, 120, 122, 124. Each of damper terminals 118, 120, 122, 124 is configured to receive wires that are used to transmit a signal to a damper to control the position of the damper. Microprocessor 110 is also configured to transmit signals to equipment terminals 126 of HVAC equipment, such as a fluid temperature conditioning device. Equipment terminals 126 are configured to receive wires that are used to transmit signals to HVAC equipment 127, such as a furnace, boiler, air conditioner, or heat pump, to control the operation of the HVAC equipment. In the embodiment of FIG. 2, equipment terminals 126 include a terminal 125 configured to communicate with a dehumidification terminal 129 of the HVAC equipment 127, where the HVAC equipment 127 has a variable speed blower. Terminal 125 can be called a variable speed blower terminal.

An interface 128 is provided that is in communication with microprocessor 110 and is used to input various parameters and make various selections to affect the operation of the zone controller 70. Interface 128 may take a number of forms, such as a plurality of dip switches, dials, and potentiometers and other electronic components, an LCD screen and buttons, or a plurality of film-style switches. Interface 128 is particularly adapted for use during the installation process in order to configure the zone controller 70 to operate properly with the specific HVAC equipment that is present. Operation module 130 is intended for use during the operation of the zone controller 70 for determining the status of the zone controller 70 and for providing operation inputs. For example, operation module 130 may be configured to provide indicator lights that indicate the status of an aspect of zone controller 70, and may be configured to provide switches for setting a mode of operation. Operation module 130 is in communication with microprocessor 110. Each of the electrical components of zone controller 46 is attached to an electronic board 132.

As discussed above, the variable speed blower terminal 125 is configured to control a variable speed blower within the fluid temperature conditioning device. The variable speed blower of the present invention is configured to change between only a first state and a second state, where the first state is an off state and the second state is an alternating current signal state. This change in states comprises a signal that controls the operation of the variable speed blower. In some embodiments, the first state is characterized by a zero voltage state, and in other embodiments, the first state is comprised of a RMS (root mean square) voltage of 0 volts. In some embodiments, the second state has a RMS voltage of 24 volts. In some embodiments, the second state is an alternating current with a frequency of 60 Hz. In other embodiments, the second state is an alternating current with a frequency of 50 Hz. In some embodiments, the first state of the variable speed blower terminal 125 causes the blower to operate at a relatively higher output and the second state of the variable speed blower terminal 125 causes the blower to operate at a relatively lower output. In other embodiments, the first state of the variable speed blower terminal 125 causes the blower to operate at a relatively lower output and the second state of the variable speed blower terminal 125 causes the blower to operate at a relatively higher output.

The invention further includes a method of controlling a fluid temperature conditioning device. As depicted in FIG. 3, the method 200 includes step 202 of receiving a plurality of thermostat signals, wherein each of the plurality of thermostats is located within one of a plurality of zones. Step 204 includes transmitting a plurality of damper control signals, where each damper control signal is configured to control one of a plurality of zone dampers in response to the thermostat signals received in step 202. Step 206 includes transmitting a control signal to control a fluid temperature conditioning device, where the fluid temperature conditioning device includes a variable speed blower. Step 208 includes determining how many of the plurality of the zones are calling for conditioning at a given point in time. Then step 210 includes changing the state of a variable speed blower terminal in response to the number of zones that are calling for conditioning. The variable speed blower terminal is configured to control a variable speed blower within the fluid temperature conditioning device. Furthermore, the variable speed blower terminal is configured to change between only a first state and a second state, where the first state is an off state and the second state is an AC signal.

The present invention should not be considered limited to the particular examples described above, but rather should be understood to cover all aspects of the invention as fairly set out in the attached claims. Various modifications, equivalent processes, as well as numerous structures to which the present invention may be applicable will be readily apparent to those of skill in the art to which the present invention is directed upon review of the present specification. The claims are intended to cover such modifications and devices.

The above specification provides a complete description of the structure and use of the invention. Since many of the embodiments of the invention can be made without parting from the spirit and scope of the invention, the invention resides in the claims.

What is claimed is:

1. A zone control panel comprising:
    (i) a plurality of thermostat terminals, each thermostat terminal configured to receive signals from one of a plurality of thermostats, where each of the plurality of thermostats is located within one of a plurality of zones;
    (ii) a plurality of damper terminals, each damper terminal configured to transmit signals to control one of a plurality of zone dampers;
    (iii) one or more terminals for transmitting signals to control a fluid temperature conditioning device having a variable speed blower; and
    (iv) a blower terminal for transmitting a signal to a dehumidification terminal associated with the fluid temperature conditioning device, where the dehumidification terminal is labeled or indicated for use with a dehumidification operating mode or to initiate a dehumidification operating mode of the variable speed blower, and where the signal transmitted from the blower terminal changes between only a first state and a second state in response to the number of zones that are calling for conditioning, wherein the first state is an off state and the second state is an on state having a predetermined alternating current (AC) voltage, and where the change in the state of the signal transmitted from the blower terminal causes the speed of the variable speed blower to change.

2. The zone control panel of claim 1, wherein the second state is a 24 Volt AC signal.

3. The zone control panel of claim 1, wherein the second state is a 24 Volt AC signal with a frequency of 60 Hertz.

4. The zone control panel of claim 1, wherein
    (i) the variable speed blower terminal is at the second state when more than one of the plurality of zones is calling for conditioning, wherein the second state causes the variable speed blower to operate at a relatively higher output; and
    (ii) the variable speed blower terminal is at the first state when only one of the plurality of zones is calling for conditioning, wherein the first state causes the variable speed blower to operate at a relatively lower output.

5. The zone control panel of claim 1, wherein
    (i) the variable speed blower terminal is at the second state when 30% or more of the plurality of zones are calling for conditioning, wherein the second state causes the variable speed blower to operate at a relatively higher output; and
    (ii) the variable speed blower terminal is at the first state when less than 30% of the plurality of zones are calling for conditioning, wherein the first state causes the variable speed blower to operate at a relatively lower output.

6. The zone control panel of claim 1, where the variable speed blower terminal communicates with a terminal of the fluid temperature conditioning device that is labeled "DS," "BK," or "DEHUM."

7. A method of controlling a fluid temperature conditioning device comprising:
    (i) receiving a plurality of thermostat signals, wherein each of the plurality of thermostats is located within one of a plurality of zones;
    (ii) transmitting a plurality of damper control signals, each damper control signal configured to control one of a plurality of zone dampers;
    (iii) transmitting an equipment control signal to control a fluid temperature conditioning device;
    (iv) determining a number of the plurality of the zones that are calling for conditioning; and
    (v) changing a voltage of a variable speed blower terminal in response to the number of zones that are calling for conditioning, the variable speed blower terminal being configured to control a variable speed blower within the fluid temperature conditioning device, wherein the variable speed blower terminal is configured to change between only a first voltage and a second voltage, where the first voltage corresponds to an off state and the second voltage corresponds to an alternating current (AC) signal state having a predetermined AC voltage.

8. The method of controlling a fluid temperature conditioning device of claim 7, where the second voltage of the variable speed blower terminal is 24 Volts AC.

9. The method of controlling a fluid temperature conditioning device of claim 7, where the second voltage of the variable speed blower terminal is 24 Volts AC at a frequency of 60 Hz.

10. The method of controlling a fluid temperature conditioning device of claim 7, wherein the step of changing the voltage of a variable speed blower terminal comprises
    (i) setting the variable speed blower terminal at the second voltage when more than one of the plurality of zones is calling for conditioning, wherein the second voltage causes the variable speed blower to operate at a relatively higher output; and
    (ii) setting the variable speed blower terminal at the first voltage when only one of the plurality of zones is calling for conditioning, wherein the first voltage causes the variable speed blower to operate at a relatively lower output.

11. The method of controlling a fluid temperature conditioning device of claim 7, wherein the step of changing the voltage of a variable speed blower terminal comprises
    (i) setting the variable speed blower terminal at the second voltage when 30% or more of the plurality of zones are calling for conditioning, wherein the second voltage causes the variable speed blower to operate at a relatively higher output; and
    (ii) setting the variable speed blower terminal at the first voltage when less than 30% of the plurality of zones are calling for conditioning, wherein the first voltage causes the variable speed blower to operate at a relatively lower output.

12. The method of controlling a fluid temperature conditioning device of claim 7, where the variable speed blower terminal communicates with a terminal of the fluid temperature conditioning device that is labeled "DS," "BK," or "DEHUM."

13. A zone control panel comprising:

(i) a plurality of thermostat terminals, each thermostat terminal configured to receive signals from one of a plurality of thermostats, where each of the plurality of thermostats is located within one of a plurality of zones;

(ii) a plurality of damper terminals, each damper terminal configured to transmit signals to control one of a plurality of zone dampers;

(iii) one or more terminals for transmitting signals to control a fluid temperature conditioning device; and (iv) a variable speed blower terminal that changes voltage in response to the number of zones that are calling for conditioning, the variable speed blower terminal being configured to control a variable speed blower within the fluid temperature conditioning device, wherein the variable speed blower terminal is configured to change between only a first voltage and a second voltage, where the first voltage corresponds to an off state and the second voltage corresponds to an alternating current (AC) signal state having a predetermined AC voltage.

14. The zone control panel of claim 13, wherein the second voltage is 24 Volts AC.

15. The zone control panel of claim 13, wherein the second voltage is 24 Volts AC at a frequency of 60 Hertz.

16. The zone control panel of claim 13, wherein (i) the variable speed blower terminal is at the second voltage when more than one of the plurality of zones is calling for conditioning, wherein the second voltage causes the variable speed blower to operate at a relatively higher output; and (ii) the variable speed blower terminal is at the first voltage when only one of the plurality of zones is calling for conditioning, wherein the first voltage causes the variable speed blower to operate at a relatively lower output.

17. The zone control panel of claim 13, wherein (i) the variable speed blower terminal is at the second voltage when 30% or more of the plurality of zones are calling for conditioning, wherein the second voltage causes the variable speed blower to operate at a relatively higher output; and (ii) the variable speed blower terminal is at the first voltage when less than 30% of the plurality of zones are calling for conditioning, wherein the first voltage causes the variable speed blower to operate at a relatively lower output.

18. The zone control panel of claim 13, where the variable speed blower terminal communicates with a terminal of the fluid temperature conditioning device that is labeled "DS," "BK," or "DEHUM."

* * * * *